J. W. SMITH.
CORN HUSKING MACHINE.
APPLICATION FILED JUNE 6, 1910.

999,128.

Patented July 25, 1911.

3 SHEETS—SHEET 1.

WITNESSES

INVENTOR
John W. Smith
By Robt. P. Harris
Attorney

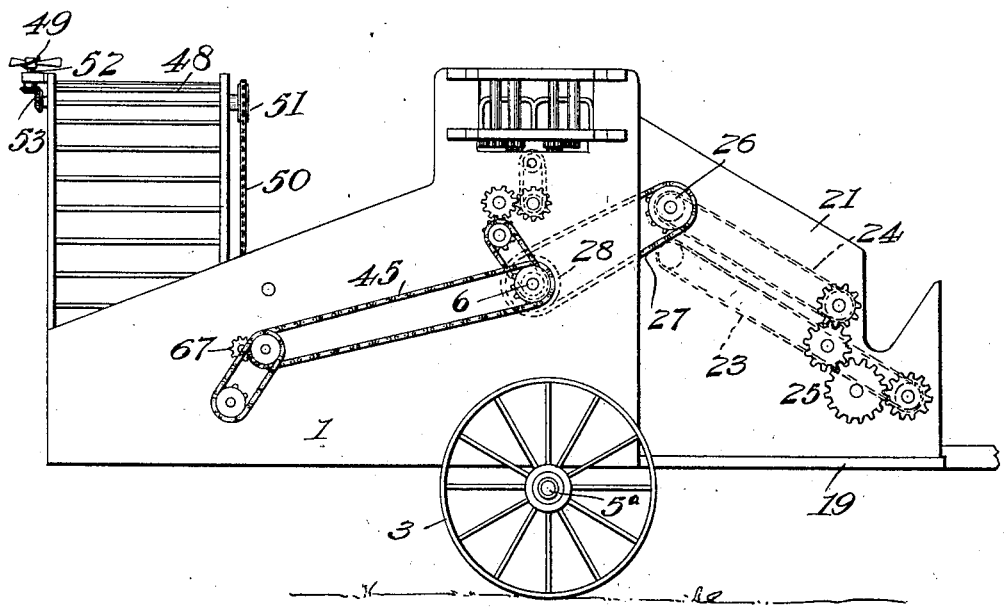
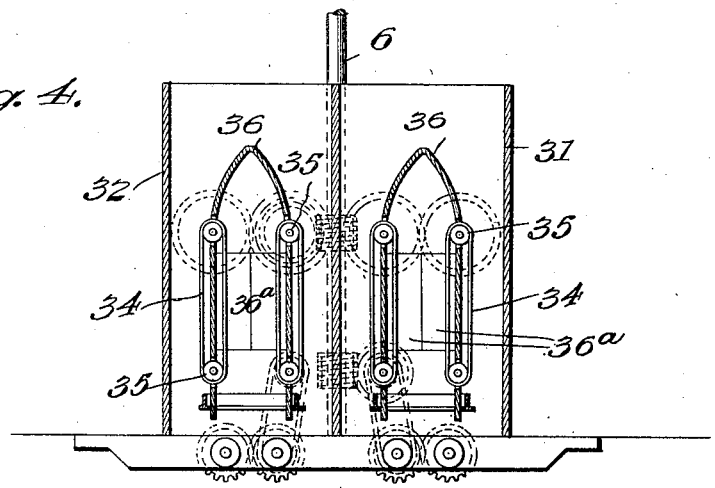

J. W. SMITH.
CORN HUSKING MACHINE.
APPLICATION FILED JUNE 6, 1910.
999,128.
Patented July 25, 1911.
3 SHEETS—SHEET 3.
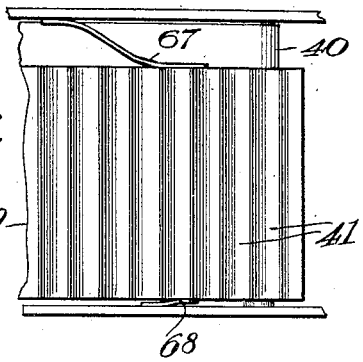
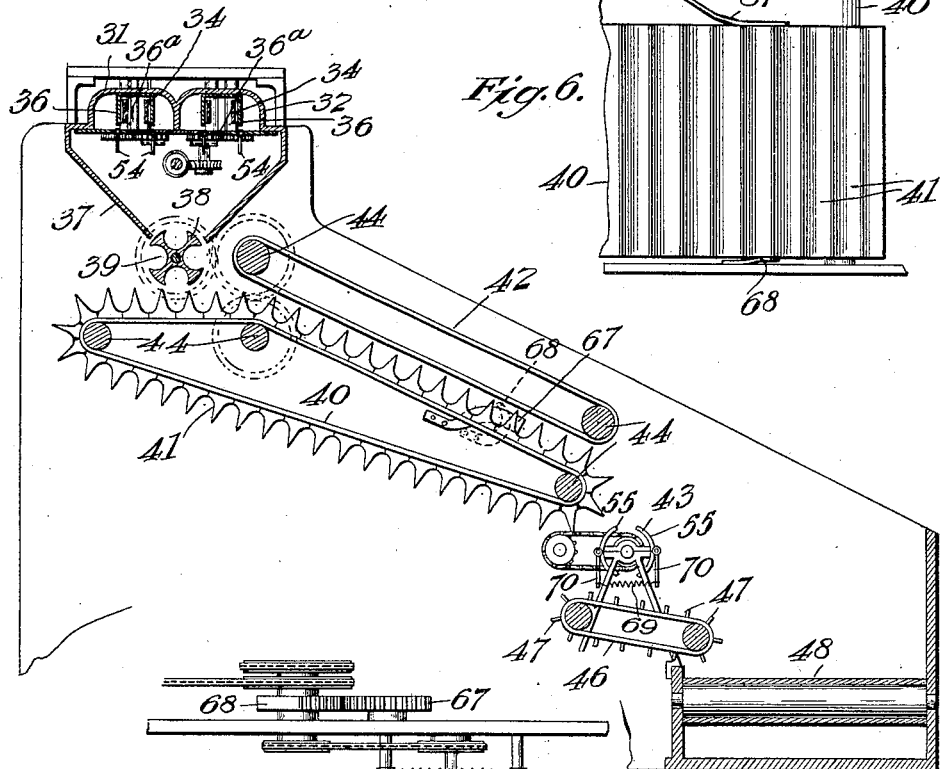
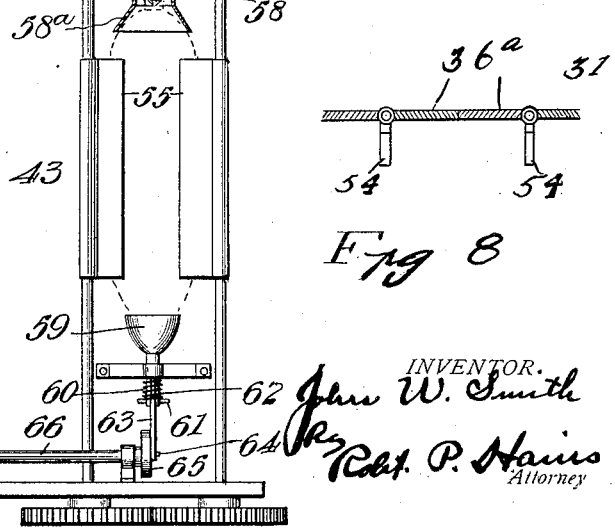
WITNESSES
INVENTOR.
John W. Smith
Robt. P. Harris
Attorney

UNITED STATES PATENT OFFICE.

JOHN W. SMITH, OF MUSKOGEE, OKLAHOMA.

CORN-HUSKING MACHINE.

999,128.	Specification of Letters Patent.	Patented July 25, 1911.

Application filed June 6, 1910. Serial No. 565,404.

*To all whom it may concern:*

Be it known that I, JOHN W. SMITH, a citizen of the United States, residing at Muskogee, county of Muskogee, and State of Oklahoma, have invented certain new and useful Improvements in Corn-Husking Machines, of which the following is a full, clear, and exact specification.

This invention relates to corn husking machines adapted for use in the field, and its primary object is to provide a machine of novel and effective construction designed to be driven alongside a row of corn and to cut the stalks so that they will fall upon the machine and be delivered to a device for cutting the ears from the stalk, the ears in turn being automatically operated upon to remove the stem and loosen the husks which are subsequently blown from the ear by a revolving fan.

A further object of the invention is to provide a corn husker with a revoluble drill for removing the stem of the husk, and means coöperating with the drill for holding the ear in contact therewith.

A further object of the invention is to provide means for removing projecting portions of the husk stem from the ears to adapt the latter to readily pass to the drill.

With these, and such other objects as may be disclosed hereinafter, in view, the invention consists in a corn husker, embodying novel features which will be fully described in connection with the accompanying drawings forming a part of this specification, and set forth and defined in the appended claims.

Figure 1:
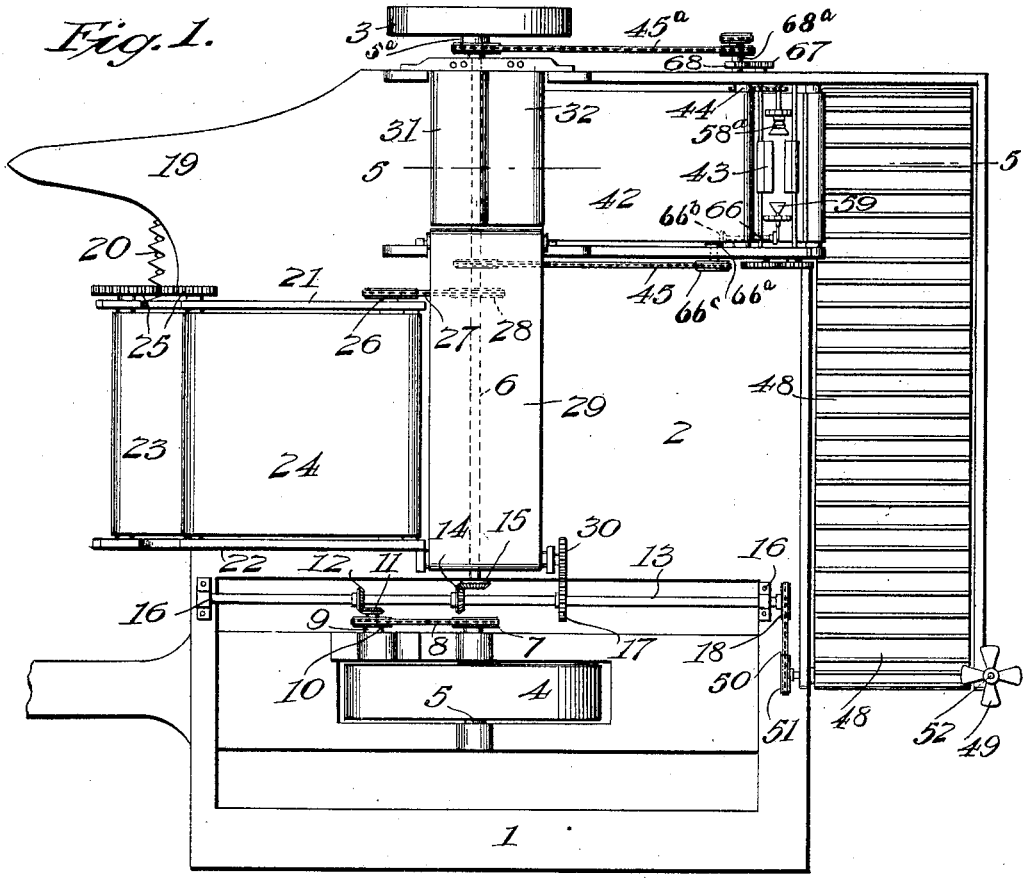
Figure 2:
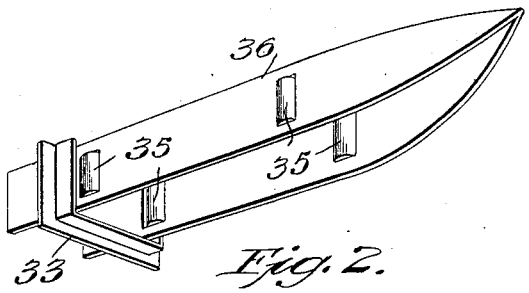

In the drawings:—Figure 1 is a top plan view of a corn husking machine embodying the invention; Fig. 2 is a view in perspective of one of the stalk guides provided with a cutter for removing the ears from the stalk; Fig. 3 is a side elevation of the machine; Fig. 4 is a horizontal section on an enlarged scale of the stalk receiving guides equipped with cutters for severing the ears, and with means for conveying the stalks through said guides, and discharging them at one side of the machine; Fig. 5 is a vertical section on the line 5—5 of Fig. 1; Fig. 6 is a plan view of means employed for trimming off superfluous portions of the stalk stems, and Fig. 7 is a detail view on an enlarged scale showing in plan the drill, and elements coöperating therewith for removing the stem from the husk, and for holding the stem end of the ear in contact with the drill. Fig. 8 is a detail sectional view showing the discharge doors of the guide shoes.

The reference numeral 1 designates the frame of the machine, and 2 a platform constituting a part of the frame, upon which an operator or attendant may stand to guide the stalks by hand as will be explained hereinafter.

The machine frame is supported upon wheels 3 and 4 mounted respectively upon axles 5ª and 5, the axle 5 having a sprocket wheel 7 mounted upon its inner end and connected by a chain 8 with a sprocket wheel 9 mounted upon a short shaft 10 supported upon the frame and carrying a bevel pinion 11 meshing with a similar pinion 12 fixed upon a shaft 13 extending at right angles to the axle 5 and carrying another bevel pinion 14 meshing with a pinion 15 upon the end of a shaft 6. The shaft 13 is mounted in bearings 16 of the frame and upon it are fixed a spur gear 17, and a sprocket wheel 18.

The machine frame is provided with a gathering shoe 19, and a sickle or cutter bar 20, located within the shoe 19 and operated through any suitable gear connections from the main shaft or axle 5. Between suitable frame bars 21 and 22 at the front of the machine are mounted two pairs of rollers arranged one pair above the other to support coöperating endless carriers 23 and 24, the lower carrier 23 extending well in advance of the upper carrier 24 to receive the corn stalks as they fall after being cut by the reciprocating cutter bar 20 and carry them rearward under the carrier belt 24. The forward rollers of the carrier belts 23 and 24 are geared together by gears 25, and the rear roller of the upper belt 24 carries a sprocket wheel 26 connected by a chain 27 with a sprocket wheel 28 on the shaft 6. After passing rearward and upward between the belt carriers 23 and 24 the stalks are delivered upon an endless belt carrier 29 supported by suitably mounted rollers, and driven by a spur gear 30 meshing with the gear 17. As clearly shown in Fig. 1, this carrier 29 revolves transversely of the machine, being disposed at right angles to the carriers 23 and 24.

An attendant standing upon the platform 2 guides the stalks by hand into parallel stalk guides 31 and 32, the construction of which is shown in Figs. 2, 4 and 5 and will be specifically described later on. As the stalks pass through the guides 31 and 32 the ears are severed from the stalks by a knife 33 disposed transversely of the guides, and the stalks, by means of parallel revolving belts 34 mounted upon vertically disposed rollers 35 carried by shoes 36 within the guides are discharged at the side of the machine through the outer open ends of the guides. The ears of corn drop by gravity through hinged and weighted trap doors 36$^a$ in the bottoms of the shoes 36 and fall through a hopper 37 (Fig. 5) upon a roll 38 formed with equidistant longitudinal grooves 39, said grooves being so formed as to impart to the roll 38 a cross sectional contour resembling a Maltese cross. Below the grooved roll 38 is arranged an endless conveyer 40 provided with parallel channels or pockets 41 each adapted to receive an ear of corn, and above this channeled conveyer is an endless belt 42 supporting the ears upon the conveyer 40 and directing them to a husking device 43 which is shown in detail in Fig. 7 and will be specifically described hereinafter. The conveyer 40 and belt 42 are mounted upon rollers 44 equipped with suitable gearing and driven by chain 45, and suitable gearing from the main shaft 6.

After the ears are operated upon by the husking device as will be explained, they are delivered to an endless carrier 46 arranged below the husking device and provided with pins 47, which in turn delivers them to an inclined endless elevator or conveyer 48 adapted to elevate the ears and discharge them into a wagon driven alongside the husking machine. At the upper end of the conveyer 48 is arranged a revolving fan 49 adapted to be driven by a chain 50 and suitable gearing from the shaft 13, the upper roller of the conveyer 48 carrying a sprocket 51 which with the sprocket wheel 18 supports the chain 50. The fan 49 is mounted upon a vertical shaft 52 driven by means of miter gearing 53 from the upper roller of the conveyer 48. This fan 49 is rapidly revolved, and blows the loosened husks from the ears of corn before the ears are delivered to the wagon.

Referring now to Figs. 4, 5 and 8, each of the trap doors comprises two hinged members each having a depending extension 54 serving as a weight to automatically close the doors to the position shown in Figs. 4 and 5 after they have been opened by the weight of the ears.

The husking device 43 will now be described, especial reference being made to Fig. 7. It comprises two confronting approximately semi-circular plates 55 mounted upon parallel shafts 56 and adapted to support an ear of corn between them. The upper portions of the plates or holders 55 are adapted to separate to receive the ears from the conveyer 40, and said plates separate at their under sides to discharge the ears after they have been operated upon by the husking devices.

The numeral 57 designates a revoluble spindle suitably mounted between the shafts 56, and carrying a conical drill 58, the function of which is to bore into the butt end of the ear of corn to remove the stem and loosen the husk from the ear.

To guide the butt end of the ear of corn in order that the drill 58 will act directly on the stem portion the cup shaped device 58$^a$ is slidably mounted on the spindle 57 in a tubular casing 58$^c$, within which is located the spring 58$^b$, normally forcing said cup shaped device 58$^a$ against the ear of corn and centering the same for action by the drill. In horizontal alinement with the drill 58 is arranged a cup shaped holder 59, which receives the tip end of the ear and holds the ear against the drill. This holder 59 is provided with a stem 60 slotted longitudinally to receive a cross pin 61, a coil spring 62 being interposed between the pin 61 and the inner wall of the slot in the stem. A pitman 63 connects the pin 61 with the pin 64 of a crank disk 65 mounted upon a revoluble shaft 66 miter-geared as at 66$^a$ to a suitably supported shaft 66$^b$ bearing a sprocket pinion 66$^c$ driven by the chain 45 before described. This construction of the holder stem 60 and elements coöperating therewith permits the holder to be forced against the tip end of the ear by the movement of the pitman, and the spring 62 allows the holder to yield and accommodate itself to ears of varying length.

The opening and closing movement of the plates 55 may be effected by any suitable mechanism, but I have here shown the two shafts 56 carrying said plates geared together at their outer ends and one of said shafts 56 is extended and has mounted thereon a gear wheel 67 meshing with a mutilated gear 68 borne by a shaft 68$^a$ provided with a sprocket pinion 68$^b$ driven by a chain 45$^a$, the duplicate of chain 45, receiving motion from a sprocket pinion on the shaft 6. The plates are held normally separated at the top by means of a spring 69 connecting two arms 70 depending from the shafts 56 and the separation of the plates at the bottom to discharge the ear is effected by the meshing of the teeth of the mutilated gear with the gear 67. This effects a partial revolution of the shafts 56 sufficient to separate the plates below and as soon as the smooth portion of the mutilated gear reaches the gear 67 the spring 69 returns the shafts 56 and separates the upper sides of the plates to receive another ear.

The gearing for driving the shaft 66 is so timed that the pitman 63 will not withdraw the holder 59 until the ear has been drilled. The relative arrangement, sizes and timing of the gears employed will insure the action of the parts in unison. This boring out of the stem of the husk is an important and a distinguishing feature of the invention, for the reason that the removal of the stem loosens the entire husk, and the travel of the ears upon the elevator 48 further loosens the husk so that it is readily blown off the ear by the action of the fan, 49. When the ears are severed from the stalks an inch or two of stem is left projecting from the ear and it is desirable to remove this superfluous stem before the ears pass to the husking device 43. To accomplish this I provide the devices shown in Fig. 6, which shows a plan view of the carrier 40 having the pockets 41. The carrier is wider than the length of these pockets, and it is designed to have said pockets shorter than any ear of corn that may drop into them, so that a curved spring 67 secured at one side of the carrier, may bear against the tip of every ear of corn that passes it to force the stem end of the ear into the path of a knife 68 arranged at the opposite side of the carrier 40, thus insuring the removal of the projecting portion of the stem.

While parts of the gearing and other power transmission devices shown have been specifically referred to, the details of construction of these elements of the machine are intended to be shown only conventionally.

Having thus fully described my invention, what I claim as new and desire to secure by Letters Patent is:—

1. In a corn husker, a husking device comprising a pair of spaced parallel shafts, ear supports carried thereby, means for intermittently operating said shafts to cause said supports to drop the ear, a stemmer for engaging one end of the ear, and a holder for the other end of said ear.

2. In a corn husking machine, a pair of spaced parallel ear supports, means for normally retaining the same in ear supporting position, means for causing said supports to drop an ear carried thereby, a stemmer for one end of an ear carried by said supports, and a holder for the other end of said ear.

3. In a corn husker, a husking device comprising spaced parallel shafts, ear supports carried thereby, means for intermittently operating said shafts to cause said supports to drop the ear, a stemmer for engaging one end of the ear comprising a rotary drill for removing the stem of the husk by boring and loosening the leaves thereof, and a holder for the other end of said ear.

4. In a corn husking machine, a pair of spaced parallel shafts, semi-circular plates fast therein and arranged in parallel relation, a spring connection between said plates for normally retaining the same in ear supporting positions, a gear connection between said shaft, a gear carried by one of said shafts, a mutilated gear in mesh therewith for intermittently rotating said shaft, a stemmer for removing the stem from one end of an ear, and a holder for the other end of said ear.

5. A husking machine comprising a guide shoe, means for conveying an ear therein stalk severing means carried by said shoe, doors hinged in the base of said shoe for discharging ears therefrom and provided with means for normally retaining the same closed, and husk loosening means, and means for conveying ears from said shoe to said husk loosening means.

6. A husking machine comprising a pair of guide shoes having open ends, means for delivering ears to said open ends, ear conveying means in said shoes, ear severing means carried by said shoes, trap doors normally sealing the bottoms of said shoes but adapted to open when ears are received therein, pendent weights for closing said doors, husk loosening means, and means for conveying ears from said shoes to said husking means.

7. A husking machine comprising a guide shoe, means for conveying an ear therein, ear severing means carried by said shoe, doors hinged in the base of said shoe, for discharging ears therefrom and provided with means for normally retaining the same closed, husk loosening means comprising a rotary drill for removing the stem of the husk by boring and loosening the leaves thereof, and means for conveying ears from said shoe to said husk loosening means.

In testimony whereof I have signed my name to this specification in the presence of two subscribing witnesses.

JNO. W. SMITH.

Witnesses:
 AVERY H. THOMAS,
 G. A. DE LAMBERT.

---

Copies of this patent may be obtained for five cents each, by addressing the "Commissioner of Patents, Washington, D. C."